United States Patent Office 3,530,080
Patented Sept. 22, 1970

3,530,080
STABLE VINYL ACETATE COPOLYMER EMULSION, ITS PREPARATION AND COATING COLORS PREPARED THEREFROM
Harold Kirkwood Inskip, Tonawanda, N.Y., assignor to E. I. du Pont de Nemours and Company, Wilmington, Del., a corporation of Delaware
No Drawing. Continuation-in-part of application Ser. No. 659,319, Aug. 9, 1967. This application Mar. 26, 1969, Ser. No. 810,830
Int. Cl. C08f *15/02, 15/04;* C08h *7/00*
U.S. Cl. 260—8
23 Claims

ABSTRACT OF THE DISCLOSURE

A vinyl acetate/ammonium salt of an unsaturated mono or dicarboxylic acid copolymer emulsion is prepared by introducing the acid comonomer in the reaction mixture as the ammonium salt so as to prepare an emulsion and coating color stable at a pH of at least 8.5.

CROSS-REFERENCE TO RELATED APPLICATIONS

This application is a continuation-in-part of pending application Ser. No. 659,319, filed Aug. 9, 1967, now abandoned.

BACKGROUND OF INVENTION

Field of invention

This invention relates to vinyl acetate copolymer emulsions, processes for their preparation and paper-coating compositions prepared therefrom.

Prior art

Emulsions of polyvinyl acetate and of vinyl acetate copolymers are well known. Many varieties are described in the literature, as is the utility of these products in a broad variety of end uses including coatings, impregnants and adhesives. In recent years, increasing quantities of these emulsions have been employed as binders for mineral pigments in paper and paperboard coatings. Homopolymer emulsions are employed but copolymer emulsions which contain a small amount of a copolymerized unsaturated acid have broader utility because the comonomer increases the adhesion of the polymer particles to the pigment particles, and the presence of the carboxyl groups in the polymer facilitates the recovery of scrap paper by increasing the solubility of the binder in dilute alkali.

In addition to having high pigment binding efficiencies, emulsions used in pigmented coatings for paperboard must have certain other characteristics. Among these are good mechanical stability to permit the coating color to withstand high shear forces encountered in high-speed paper-coating equipment and stability over a broad pH range, since some coating compositions are neutral or even slightly acidic while others are adjusted to pH levels as high as 9 to 9.5. However, a problem commonly encountered in the development of synthetic polymer emulsions, including vinyl acetate polymer emulsions, for use as pigment binders is that as the concentration of acid comonomer is increased to the level which permits easy redispersibility in dilute alkali, the stability of the emulsion and of coating colors made with it becomes unacceptable at high pH levels.

SUMMARY OF THE INVENTION

According to the present invention there is provided an aqueous emulsion stable at high pH comprising as essential components 40 to 60% by weight of a copolymer consisting essentially of at least about 67% vinyl acetate, 0 to about 30% of a copolymerizable monomer and up to about 3% by weight (preferably between 1 and 3%) based on the weight of the copolymer, of the ammonium salt of an unsaturated mono or dicarboxylic acid, and from about 1 to 5% by weight, based on the weight of the emulsion, of an anionic or nonionic surfactant.

The process for preparing the above stable emulsion comprises polymerizing at least about 67% vinyl acetate, 0 to about 30% of a copolymerizable monomer and up to about 3% by weight (preferably between 1 and 3%) of the ammonium salt of an unsaturated mono or dicarboxylic acid at a pH within the range of about 4 to 7 in the presence of a surfactant and redox initiator system to obtain an emulsion having a polymeric solids content of 40 to 60% by weight.

DETAILED DESCRIPTION OF THE INVENTION

The stable aqueous emulsion of the present invention comprises two essential components. The first component is 40 to 60% by weight, preferably 45 to 50% by weight, of a vinyl acetate copolymer, and the second component is 1 to 5% by weight, based on the weight of the emulsion, of surfactant. The copolymer comprises at least 67% vinyl acetate, 0 to 30% of a copolymerizable monomer and up to about 3% by weight, preferably between 1 and 2.5% by weight, of an ammonium salt of an unsaturated mono or dicarboxylic acid. In general, there should not be less than 0.5% of the ammonium salt of the unsaturated acid. Suitable monocarboxylic acids include acrylic acid, methacrylic acid and crotonic acid. Further useful monocarboxylic acids include the unsaturated dicarboxylic acids in which one of the carboxyl groups has been esterified with alkanols, preferably of 1 to 8 carbon atoms or amidized to contain the $NR_2$ group wherein $R_2$ is hydrogen, alkyl of 1 to 8 carbon atoms and cyclic alkyl. Such unsaturated dicarboxylic acids would include maleic acid, fumaric acid, and itaconic acid. The most preferred unsaturated monocarboxylic acid comonomers are ammonium acrylate and ammonium methyl maleate. A preferred dicarboxylic acid is itaconic acid.

The term copolymerizable monomer means those monomers copolymerizable with vinyl acetate. This would include 1 to 20, preferably 1 to 8, carbon alkyl esters of acrylic, methacrylic, maleic and fumaric acids; vinyl esters of 3 to 20 carbon saturated acids; olefins, such as ethylene and propylene; vinyl chloride; N-vinyl pyrrolidone and vinylidene chloride.

It has been found that in the exercise of this invention the alkali redispersibility of the paper coating increases with increasing acid comonomer concentration with satisfactory results beginning to occur at concentrations of between 1 and 3% by weight, most preferably between 1.5 and 2.5% by weight. Satisfactory stabilization and good adhesion to substrates are also obtained when the ammonium salt of the acid content is within the range of 1 to 3% by weight. Smaller or larger amounts of this monomer tend to have no effect or unfavorably alter some important properties of the vinyl acetate component of the copolymer, such as water resistance, without adding at all to the excellent adhesion of the binder to substrates.

The surfactants usable in the emulsions can be anionic or nonionic. Variations in the type and amount of such agents will influence the stabilty of the emulsions as well as the rate of polymerization, as is well known. The surfactants used should be of long-chain, i.e., contain at least 12 carbon atoms, and their total weight should not exceed 5% of the total emulsion weight, and preferably be within the range of 1 to 5% by weight. Examples of anionic emulsifying agents that can be used include the higher fatty alcohol sulfates such as sodium lauryl sulfate, the alkylaryl sulfonates such as sodium tertiary octylphenyl sulfonate, the sodium dioctylsulfosuccinates, the sodium dihexylsulfosuccinates, phosphates and phosphate ester salts, etc. Among the usable nonionic surfactants are the alkyl phenoxy polyethoxy ethanols having alkyl groups of about 7 to 18 carbon atoms and 6 to 60 or more oxyethylene units, such as octylphenoxy polyethoxy ethanols; the polyethoxy ethanol derivatives of methylene linked alkyl phenols; the ethylene oxide derivatives of long-chain carboxylic acids such as lauric, myristic, oleic or mixtures of such acids as found in tall oil containing 6 to 60 oxyethylene units per molecule; block copolymers of ethylene oxide and propylene oxide comprising a hydrophobic polypropylene oxide section combined with hydrophilic polyethylene oxide sections.

In preparing the stable emulsion of the invention, vinyl acetate and the ammonium salt of a mono or dicarboxylic acid and optionally a copolymerizable monomer are polymerized at a pH within the range of 4 to 7 in the presence of a surfactant and redox initiator system. Best polymerization results are obtained by the agency of a two-component redox free radical initiator system. Suitable oxidizing components for this system are the water-soluble inorganic peracid salts such as ammonium, potassium and sodium persulfates, and the like. Also usable are the oil soluble organic hydroperoxides such as tert.-butyl hydroperoxide, cumene hydroperoxide, and esters of the tert.-butyl perbenzoate type. The preferred oxidizing component is a mixture of the two types. Among the useful reducing components may be listed compounds like the sulfites, bisulfites, hydrosulfites and thiosulfates; ethyl and other alkyl sulfites; the sulfoxylates, such as sodium formaldehyde sulfoxylate, and the like. The amount of each component, as well the total amount of catalyst, depends upon the type of component used as well as on other polymerization conditions in a range between 0.01 and 1.0% by weight of the total polymerization system. The preferred range is 0.03 to 0.2%. The polymerization reaction should be carried out at temperatures below 100° C., and preferably between 40 and 70° C. After the polymerization is complete, ammonium hydroxide may be added to the emulsion to raise the pH.

In the preparation of coating colors, any of the conventional mineral pigments or mixtures of pigments can be employed with the emulsions, the nature and amount of each pigment being primarily dependent upon the use intended for the preparation. The proportions of solid polymer binder to pigment may vary quite widely. In coating fibrous substrates such as printing paper, emulsions containing from about 3 to about 30 parts by weight of solid binder per 100 parts of mineral pigment are preferred, the best results being achieved with about 10 to 20 parts per 100 parts of pigment. Common pigments applied to paper stock in the manufacture of mineral coated papers and the like comprise aqueous suspensions of the finely divided mineral and include clay, calcium carbonate, titanium dioxide, talc, satin white, lithopone, finely divided metals such as aluminum, color lakes in tinctorial oxides. These coating compositions can further comprise aqueous solutions or emulsions of the copolymer and an additional adhesive such as casein, glue, soya protein, a starch including modified starches such as enzyme converted, acid hydrolyzed, dextrine, etc., and starch derivatives such as ethoxylated, esterified, etc., polyvinyl alcohol and others.

The coating compositions contain 3 to 30 parts of pigment binder per 100 parts of pigment which can be all copolymer, or combinations of copolymer with other binder types. Proportions can vary widely according to end use requirements and application techniques. Other additives such as lubricants, plasticizers, flow modifiers, water retention aids, antifoams, thickeners and wetting agents can also be used with the emulsion or coating colors.

The dispersions can be used at any convenient pH in the range of about 4 to 10. When used in pigmented paper coatings as the sole binder or with starch, there is often no need to adjust pH. However, when used with protein or casein, it is necessary to dissolve these materials at an alkaline pH. Any alkali, such as $NH_4OH$, NaOH, borax, etc., can be used. However, $NH_4OH$ is generally preferred. The protein may be dissolved separately in an alkaline solution or may be added to the pigment slurry, made alkaline and dissolved in the presence of the pigment.

Materials to increase water resistance of the pigmented coating can also be added to the coating color. These include formaldehyde, glyoxal, urea-formaldehyde and melamine formaldehyde resins.

As a substrate to be coated, any fibrous material can be used. Such materials would include paper, paperboard and paperlike products made in whole or in part from synthetic fibers.

The invention will be further illustrated by the following examples in which parts and percentages are by weight unless otherwise indicated.

EXAMPLE 1

In a 1-gallon glass vessel fitted with a paddle stirrer, a condenser, a nitrogen inlet, a monomer feed inlet and an activator solution feed inlet was placed 44 g. of "Triton" X–305 (a 70% solids octylphenoxy polyether alcohol of 30 ethylene oxide units), 36 g. of "Santomerse" S (a 30% solids sodium decylbenzene sulfonate), 30 g. of "Pluronic" P–104 (a polyoxyethylene-polyoxypropylene glycol of 40% ethylene oxide), and 1060 g. of water. The mixture was heated, with stirring, to about 60° C. while the vessel was being purged thoroughly with nitrogen. A 1.5 g. portion of potassium persulfate was then added to the solution. The vinyl acetate feed contained 1180 g. of vinyl acetate and 1.5 g. of tert-butyl hydroperoxide. The activator/comonomer feed was prepared by mixing 3 g. of sodium formaldehyde sulfoxylate, 100 g. of water and 36 g. of methyl hydrogen maleate plus a little ice, then adding to this 24 g. of concentrated ammonium hydroxide solution, which caused the pH to rise to 7.5. Water was then added to bring the weight of the solution to 300 g.; 205 ml. (212 g.) of this solution was employed in the run. All solutions were sparged thoroughly with nitrogen. The vinyl acetate solution was added over a period of 118 minutes and the activator/comonomer feed added over a period of 110 minutes. When the addition of the latter solution was complete, an additional 29 ml. of a 1% solution of sodium formaldehyde sulfoxylate was added at a dropwise rate over a period of 45 minutes. Throughout the polymerization, the temperature was kept between 56° and 64° C., generally between 59° and 61° C. The emulsion was then cooled at room temperature and screened through a 100-mesh screen. There was essentially no coagulum. The properties of the emulsion were as follows: percent solids, 47.3; pH, 6.1; viscosity (Brookfield LVF Viscometer, No. 1 Spindle, 30 r.p.m., 25° C.), 68 cps.; percent vinyl acetate, 0.9; and mechanical stability, very good—no coagulum formed and no significant change in viscosity after being agitated in a Waring Blendor for 5 minutes at 7500 r.p.m. The vinyl acetate copolymer contained 2.3% ammonium methyl maleate and the emulsion contained 2.76% surfactant. Most of the particles had diameters between 0.1 and 0.2 micron. A small portion of the emulsion was adjusted to a pH of 9.5 with ammonium hydroxide, and no significant change in viscosity occurred in 2 days.

As a control, 24 g. of methyl hydrogen maleate were added with the vinyl acetate rather than its ammonium salt with the activator so that the vinyl acetate monomer solution contained 1180 g. of vinyl acetate, 24 g. of methyl hydrogen maleate, and 1.5 g. of t-butyl hydroperoxide. The monomer solution was fed over a period of 135 minutes and the activator solution consisting of 185 ml. of a 1% solution of sodium formaldehyde sulfoxylate was added over a period of 150 minutes. The temperature of the polymerization was kept between 58° and 62° C. After cooling the emulsion to room temperature and screening it through a 100-mesh screen, less than 0.5 g. of coagulum was present. To the screened emulsion product was added with stirring 8.5 g. of concentrated ammonium hydroxide diluted with 8.5 g. of water. The pH of the product was 6.4 and the solids content of the emulsion was 46.9%. Its viscosity (Brookfield LVF Viscometer, No. 1 Spindle, 30 r.p.m., 25° C.) was 124 cps. The residual vinyl acetate concentration was 0.5%. The electron photomicrograph revealed that most of the emulsion particles were from 0.09 to 0.13 micron in diameter.

The control emulsion was combined with three others made under essentially identical conditions. The properties of the blend were as follows: percent solids, 47.3; pH, 6.3; viscosity, 111 cps.; and percent vinyl acetate, 0.4. The mechanical stability of the blend was very good, as indicated by the fact that no coagulum was formed and no viscosity change was observed when it was agitated for 3 minutes at 7500 r.p.m. in a Waring Blendor. However, when a small portion of the blend was then treated with dilute ammonium hydroxide to raise the pH to 8.9, the viscosity of the emulsion began to rise immediately, and within a few minutes the emulsion turned to a pasty gel.

EXAMPLE 2

The equipment used in this polymerization was similar to that employed in Example 1 except the vessel was a jacketed 1.2-liter resin flask. To it was added 22 g. of "Triton" X–305, 18 g. of "Santomerse" S, 15 g. of "Pluronic" P–104, and 540 g. of water. The mixture was heated to 71° C. with stirring while being purged with nitrogen, then to it was added 2.0 g. of potassium persulfate. To the mixture over a period of 119 minutes were added (a) a solution of 590 g. of vinyl acetate and 1 g. of an antifoam agent (Colloid 581–B), (b) 20 ml. of a 4% solution of potassium persulfate in water, and (c) a solution prepared by adding 7 g. of acrylic acid to 50 g. of water and then adjusting the pH to 7.1 with ammonium hydroxide, then diluting to a total weight of 100 g. with water. The temperature was held between 69.5° and 73° C. as the solutions were added and then raised to 75° C. for a period of 26 minutes. The emulsion was then cooled to room temperature.

The properties of the emulsion were as follows: percent solids, 46.8; viscosity, 215 cps.; pH, 5.8; percent vinyl acetate, 0.4; mechanical stability, very good. Most of the emulsion particles had diameters between 0.08 and 0.12 micron. A small portion was treated with ammonium hydroxide to raise its pH to 8.6 and the viscosity of this sample had not changed appreciably after several days. The vinyl acetate copolymer contained 1.45% ammonium acrylate and the emulsion contained 2.74% surfactant.

As a control, to the polymerization vessel described in Example 1 was added 12 g. of a 75% by weight solution of sodium dioctyl sulfosuccinate wetting agent, 11.2 g. of an 80% solution of sodium dihexyl sulfosuccinate wetting agent, 3.4 g. of sodium bicarbonate and 1074 g. of water. The vessel was purged thoroughly with nitrogen as the contents were brought to 42.5° C. with agitation. To it was added 1.6 g. of sodium formaldehyde sulfoxylate. Five percent of a solution of 906.2 g. of vinyl acetate, 13.8 g. of acrylic acid and 1.6 g. of tert.-butyl hydroperoxide was pumped into the vessel rapidly over the span of one minute, and the balance of the solution was added at a near constant rate over 2.5 hours. The temperature of the reacting mixture was kept between 42.3° and 45.0° C. throughout this period by circulating cooling water through the vessel jacket. Stirring was continued for an additional 1.5 hours, during which period the temperature was kept between 42.6° and 44.8° C. The emulsion was then cooled to 24° C. and discharged. About 0.5 g. of coagulum was obtained when the emulsion was screened through a 100-mesh screen.

The solids content was 45.2%. The viscosity was 49 cps. (Brookfield Viscometer, No. 1 Spindle, 30 r.p.m., 25° C.), and the pH was 5.22. The emulsion had rather poor mechanical stability, because after being agitated at 7500 r.p.m. for 3 minutes, the emulsion had nearly completely coagulated. A small portion of the emulsion was treated with a few milliliters of dilute ammonium hydroxide to increase the pH to 8.88. The emulsion became noticeably thicker immediately and after 10 minutes had an estimated viscosity of about 1500 cps., and after 30 minutes it was so viscous that it would hardly pour. After standing 2 days, it had completely solidified.

EXAMPLE 3

The polymerization of Example 1 was repeated except 30% of the vinyl acetate was replaced by vinyl tert.-alkyl acetate of the molecular formula $C_{12}H_{22}O_2$ (Shell Chemical Co. VV10—a vinyl ester of "Versatic" 10 acid). The emulsion properties were as follows: percent solids, 45.1%; pH, 5.5; and viscosity (Brookfield LVF Viscometer, No. 2 Spindle, 30 r.p.m., 25° C.), 105 cps. The copolymer contained about 2.3% ammonium methyl maleate and the emulsion contained 2.76% surfactant.

A sample was treated with 15% ammonium hydroxide to raise the pH to 9.6, and after standing one hour the viscosity was 24 cps.

As a control, the above polymerization was repeated except methyl hydrogen maleate was used in place of the ammonium salt and was dissolved in the mixture of the other monomers. At the end of the polymerization, 7.5 g. of concentrated ammonium hydroxide was added as a buffer. This emulsion had the following properties: percent solids, 43.2%; pH, 4.0; percent vinyl acetate, 2.0; and viscosity (Brookfield LVF Viscometer, No. 2 Spindle, 30 r.p.m., 25° C.), 96 cps.

A sample was treated with 15% ammonium hydroxide to increase the pH to 9.4, and after standing one hour the viscosity could not be measured with a No. 2 spindle. With a No. 3 spindle the viscosity was 1840 cps.

EXAMPLE 4

The polymerization of Example 1 was repeated except 2% of the vinyl acetate was replaced by dibutyl maleate. The emulsion properties were as follows: percent solids, 46.2; pH, 5.9; percent vinyl acetate, 1.8; and viscosity (Brookfield LVF Viscometer, No. 2 Spindle, 30 r.p.m., 25° C.), 40 cps. The copolymer contained about 2.3% ammonium methyl maleate.

A sample of emulsion was treated with 15% $NH_4OH$ to raise the pH to 9.5, and after standing 16 hours there was no increase in viscosity.

EXAMPLE 5

The polymerization of Example 1 was repeated with the following modification:

The disperser solution consisted of 36 g. of "Santomerse" S, 13 g. of "Pluronic" F–68, 10 g. of "Triton" N–101, 44 g. of "Triton" X–305 and 900 g. of water; the monomer solution contained 1180 g. of vinyl acetate, 1.0 g. of tert.-butyl hydroperoxide, 4 g. of "Triton" N–101 and 8 g. of "Pluronic" F–68; the comonomer solution contained 12 g. of itaconic acid, 0.8 g. of potassium persulfate and 75 g. of water, which solution was treated with conc. ammonium hydroxide until the pH rose to 7.1 then diluted with water to a total weight of 128 g.; and the activator solution contained 28 g. of sodium formaldehyde sulfoxylate in 200 g. of water. The comonomer solution was fed over a period of 104 minutes and the monomer solution over a period of 112 minutes. A total of 1.4 g. of tert.-butyl hydroperoxide was added over the next 61 minutes to effect nearly complete polymerization.

The product emulsion had a solids content of 45.6% and a pH of 6.2. The vinyl acetate copolymer contained 1% itaconic acid. This would correspond to between 1.1 and 1.3% ammonium itaconate depending upon the amount of neutralization. When a 75-g. portion was treated with 8 ml. of 10% ammonium hydroxide, the pH rose to 9.6 and no increase in viscosity was apparent.

EXAMPLES 6 AND 7

A coating color formulation of the following composition was prepared:

| Materials: | Parts by weight |
|---|---|
| #1 coating clay | 100.0 |
| Emulsion (47% solids) | 42.6 |
| Water | 43.0 |
| Dispersing agent (Calgon T) | 0.4 |

The dispersing agent was dissolved in the water and the clay added with agitation. This slurry was put on a Hockmeyer disperser and stirred at about 1700 r.p.m. for about 30 minutes. The pH was adjusted to 8.5 with concentrated NH$_4$OH and the emulsion added with agitation. The change in viscosity with time was followed using the Brookfield Viscometer, Model RVT, Spindle No. 3, 50 r.p.m., 25° C. The results are shown in Table I, which follows:

TABLE I

| | Comonomer content with Vinyl Acetate (wt. percent) | Viscosity | |
|---|---|---|---|
| Example | | After preparation, cps. | 27 hrs. at 25° C., cps. |
| 6 | 2.3% AMM[1] | 565 | 786 |
| 7 | 1.5% AMM[1] | 690 | 971 |
| Control | 2.0% MHM[2] | 1,140 | [3] |

[1] AMM=Ammonium methyl maleate.
[2] MHM=Methyl hydrogen maleate.
[3] Gelled after 4 hours.

These examples show the improved stability at alkaline pH of coating colors based on the emulsions made according to Example 1.

EXAMPLES 8–11

These examples show pilot coater runs with Examples 9 and 11 using the emulsion of the invention as the sole binder and Examples 8 and 10 additionally use 2 parts by weight of protein with the emulsion. The coating color for Examples 9 and 11 was made by dispersing #1 paper coating clay on a Kady mill at 70% solids using 0.15% by weight, based on the weight of the pigment, of tetrasodium pyrophosphate as dispersing agent. Additional water was added to obtain the desired solids content. The copolymer emulsion prepared according to Example 1 and containing about 2% ammonium methyl maleate was added with agitation and the pH of the resulting coating color was adjusted to 8.5 with concentrated NH$_4$OH.

The coating color for Examples 8 and 10 was made by dispersing the clay as above. The temperature was raised to 60° C. and 10% by weight, based on the weight of the protein, of NH$_4$OH (28%) was added. Two parts by weight of soya protein was added and the clay dispersion was agitated for 15–30 minutes, after which, it was cooled to 50° C. and then the copolymer dispersion was added with agitation. 0.36 part by weight of a 37% formaldehyde solution was added and then the pH adjusted to 8.5 with NH$_4$OH if necessary.

The substrate coated for all examples was a 10-point board having a pigmented starch precoat. In Examples 8 and 9, the pilot coater used a trailing blade of the inverted type, and in Example 10 and 11 an air knife was used. The results are shown in Table II, which follows:

TABLE II

| | Coating Color Parts by wt. | | | Coater speed, Ft./Min. | Properties of the Coated Board | | | | | | |
|---|---|---|---|---|---|---|---|---|---|---|---|
| Example | Soy protein | Copolymer emulsion | Percent solids | | 75° Gloss | Opacity | Brightness | Percent K and N | PSE[1] | GIH[2] | IGT pick, Ft./Min. |
| 8 | 2 | 16 | 60 TB[3] | 1,000 | 57 | 92.6 | 82.3 | 79.4 | 52 | 51 | 212 |
| 9 | | 20 | 65 TB[3] | 1,000 | 61 | 93.2 | 82.1 | 79.4 | 54 | 49.5 | 131 |
| 10 | 2 | 16 | 45 AK[4] | 450 | 71 | 93.8 | 80.7 | 79.4 | 59 | 84 | 230 |
| 11 | | 20 | 45 AK[4] | 450 | 71 | 93.2 | 81.5 | 85.1 | 61.5 | 88.5 | 233 |

[1] PSE=Paper Surface Efficiency.
[2] GIH=Gloss Ink Holdout.
[3] TB=Trailing Blade.
[4] AK=Air Knife.

The properties of the coated board shown in Table II were determined by the following standards:
75° gloss—TAPPI T480M–51
Opacity—TAPPI T425M–60
Brightness—TAPPI T452M–58
Percent K&N—TAPPI RC–19
PSE—

$$\frac{1.33(K\&N) + \text{gloss} - 33}{2}$$

GIH—75° gloss of IPI orange gloss testing ink
IGT—TAPPI T499SU–64

What is claimed is:

1. An aqueous emulsion stable at high pH comprising as essential components 40 to 60% by weight of a copolymer consisting essentially of at least 67% vinyl acetate, 0 to 30% of a copolymerizable monomer selected from the group consisting of alkyl esters of acrylic, methacrylic, maleic and fumaric acids wherein the alkyl group is from 1 to 20 carbon atoms; vinyl esters of saturated acids of 3 to 20 carbons atoms; olefins, vinyl chloride- N-vinyl pyrrolidone and vinylidene chloride and up to about 3% by weight, based on the weight of the copolymer, of the ammonium salt of an acid selected from the group consisting of unsaturated monocarboxylic acids and unsaturated dicarboxylic acids, and from about 1 to 5% by weight, based on the weight of the emulsion, of an anionic or nonionic surfactant having at least 12 carbon atoms.

2. The emulsion of claim 1 wherein the copolymer is a copolymer of vinyl acetate and between 1 and 3% by weight of the ammonium salt of the acid selected from the group consisting of unsaturated monocarboxylic acids and unsaturated dicarboxylic acids.

3. The emulsion of claim 2 wherein the ammonium salt of the unsaturated acid is ammonium methyl maleate.

4. The emulsion of claim 2 wherein the ammonium salt of the unsaturated acid is ammonium acrylate.

5. The emulsion of claim 2 wherein the ammonium salt of an unsaturated acid is ammonium itaconate.

6. The emulsion of claim 1 wherein the emulsion contains 45 to 50% by weight of copolymer.

7. An aqueous emulsion comprising as essential components 45 to 50% by weight of a copolymer of vinyl acetate and between 1.0 and 3% by weight, based on the weight of the copolymer, of ammonium acrylate, and from about 1 to 5% by weight, based on the weight of the emulsion, of an anionic or nonionic surfactant having at least 12 carbon atoms, said emulsion being stable at a pH of at least 8.5.

8. A process for providing a vinyl acetate copolymer emulsion stable at high pH comprising polymerizing at least 67% vinyl acetate, 0 to about 30% of a copolymerizable monomer selected from the group consisting of alkyl esters of acrylic, methacrylic, maleic and fumaric acids wherein the alkyl group is from 1 to 20 carbon atoms; vinyl esters of saturated acids of 3 to 20 carbon atoms; olefins, vinyl chloride, N-vinyl pyrrolidone and vinylidene chloride and up to about 3% by weight, based on the weight of the copolymer, of the ammonium salt of an acid selected from the group consisting of unsaturated monocarboxylic acids and unsaturated dicarboxylic acids at a pH within the range of about 4–7 in the presence of an anionic or nonioinc surfactant having at least 12 carbon atoms and redox initiator system to obtain an emulsion having a polymeric solids content of 40 to 60% by weight.

9. The process of claim 8 wherein the copolymer is a copolymer of vinyl acetate and between 1 and 3% by weight of the ammonium salt of the acid selected from the group consisting of unsaturated monocarboxylic acids and unsaturated dicarboxylic acids.

10. The process of claim 9 wherein the ammonium salt of an unsaturated acid is ammonium methyl maleate.

11. The process of claim 9 wherein the ammonium salt of an unsaturated acid is ammonium acrylate.

12. The process of claim 8 wherein ammonium hydroxide is added to raise the pH to at least 8.5.

13. A process for providing a vinyl acetate copolymer emulsion stable at high pH comprising preparing a first monomer solution of vinyl acetate, a monomer copolymerizable therewith selected from the group consisting of alkyl esters of acrylic, methacrylic, maleic and fumaric acids wherein the alkyl group is from 1 to 20 carbon atoms; vinyl esters of saturated acids of 3 to 20 carbon atoms; olefins, vinyl chloride, N-vinyl pyrrolidone and vinylidene chloride in an amount to provide from 0 to about 30% by weight of the resulting copolymer and a catalytic amount of an oxygen-yielding polymerization initiator; preparing a second monomer solution of the ammonium salt of an acid selected from the group consisting of unsaturated monocarboxylic acids and unsaturated dicarboxylic acids in an amount to provide between 1.0 and 3% by weight of the resulting copolymer and a catalytic amount of the reducing component of a redox initiator system; maintaining the first and second monomer solutions in an inert atmosphere; adding the first and second monomer solutions with agitation to enough water to provide a final emulsion having a polymeric solids content of 40 to 60% by weight, said water containing an anionic or nonionic surfactant having at least 12 carbon atoms in an amount sufficient to provide 1 to 5% of the final emulsion weight; maintaining the pH of the reaction mixture within the range of about 4–7 and the temperature within the range of 40 to 70° C.; and cooling the final emulsion to room temperature.

14. The process of claim 13 wherein the resulting copolymer is a copolymer of vinyl acetate and between 1.0 and 3% by weight of the ammonium salt of an unsaturated monocarboxylic acid.

15. The process of claim 14 wherein the ammonium salt of an unsaturated monocarboxylic acid is ammonium acrylate.

16. The process of claim 13 wherein ammonium hydroxide is added to raise the pH to at least 8.5.

17. A paper coating composition comprising the emulsion of claim 1 and an aqueous pigment dispersion, there being 3 to 30 parts by weight of copolymer as pigment binder per 100 parts of pigment.

18. The composition of claim 17 wherein the pigment is clay.

19. The composition of claim 17 wherein the pigment is clay and at least one other pigment.

20. The composition of claim 17 wherein there is 10 to 20 parts by weight of copolymer as pigment binder per 100 parts of pigment.

21. The composition of claim 17 wherein the coating composition additionally contains as pigment binder casein, soya protein, a starch or polyvinyl alcohol.

22. A coated article comprising a fibrous substrate having a coating thereon of a pigment and a pigment binder comprising a copolymer of at least 67% vinyl acetate, 0 to about 30% of a copolymerizable monomer selected from the group consisting of alkyl esters of acrylic, methacrylic, maleic and fumaric acids wherein the alkyl group is from 1 to 20 carbon atoms; vinyl esters of saturated acids of 3 to 20 carbon atoms; olefins, vinyl chloride, N-vinyl pyrrolidone and vinylidene chloride and between 1 and 3% by weight, based on the weight of the copolymer, of the ammonium salt of an acid selected from the group consisting of unsaturated monocarboxylic acids and unsaturated dicarboxylic acids.

23. The coated article of claim 22 wherein the pigment binder additionally contains casein, soya protein, a starch or polyvinyl alcohol.

References Cited

UNITED STATES PATENTS

| 2,377,725 | 4/1943 | Billig. |
| 3,007,887 | 11/1961 | Essig. |
| 3,232,899 | 1/1966 | Guziak. |
| 3,238,159 | 3/1966 | Dibenedetti et al. |
| 3,245,936 | 4/1966 | Corey et al. |
| 3,271,373 | 9/1966 | Wolff. |
| 3,342,765 | 9/1967 | Oosterhof et al. |

FOREIGN PATENTS

| 993,470 | 5/1965 | Great Britain. |

WILLIAM H. SHORT, Primary Examiner

E. WOODBERRY, Assistant Examiner

U.S. Cl. X.R.

117—155; 260—17.4, 29.6, 78.5, 80.8, 85.7, 86.1, 874